United States Patent [19]

Saito et al.

[11] Patent Number: 4,845,136
[45] Date of Patent: Jul. 4, 1989

[54] ADHESIVE RESIN COMPOSITION

[75] Inventors: Atsushi Saito, Amagasaki; Yasuhiro Okuri, Mino; Takahiro Nakano, Ashiya; Masahiko Murakami, Osaka; Masaaki Okuda, Takarazuka, all of Japan

[73] Assignees: Sunstar Engineering Inc., Takatsuki; Teikoku Kako Co., Ltd., Osaka, both of Japan

[21] Appl. No.: 199,749

[22] Filed: May 27, 1988

[30] Foreign Application Priority Data

May 29, 1987 [JP] Japan ................................. 62-136111

[51] Int. Cl.$^4$ ............................................. C08K 3/32
[52] U.S. Cl. .................................................. 523/451
[58] Field of Search ......................................... 523/451

[56] References Cited

U.S. PATENT DOCUMENTS 3,976,617  8/1976  Vasta ............................. 523/451 X
4,003,867  1/1977  Cooper et al. ................. 523/451 X
4,021,503  3/1977  Goulding et al. ............. 523/451 X Primary Examiner—Earl Nielsen
Attorney, Agent, or Firm—Millen & White

[57] ABSTRACT

An adhesive resin composition comprising (a) an epoxy resin, (b) a curing agent therefor, and (c) an aluminum orthophosphate-zinc compound rust inhibiting pigment. When applied to the assembly of car body components, the composition assures improved bond strength and corrosion resistance.

11 Claims, No Drawings

ADHESIVE RESIN COMPOSITION

BACKGROUND OF THE INVENTION

1. Field of the Invention

The present invention relates to a novel thermo-setting adhesive resin composition which excels in corrosion resistance. More particularly, the invention relates to a thermo-setting adhesive composition which is suitable for bonding the hems of the outer and inner panels of the door, bonnet or trunk lid of an automobile, for instance.

2. Brief Description of the Prior Art

Structural adhesives are used for metal-to-metal bonding and should exhibit an adhesive strength equivalent to, or in excess of, the strength of the substrate metal when subjected to external forces, thereby forming a literally integral part of the metal. Such structural adhesives have recently been used widely in lieu of the earlier bonding means such as riveting, bolting, welding, etc. in aircraft, can manufacturing, electric and electronics industries. In the assembling of automotive bodies, for instance, such structural adhesives should display a positive anticorrosive property particularly in the process of joining press-formed outer and inner panels for the construction of side doors, bonnet, trunk and other component parts. Corrosion resistance is an especially important quality that is required of cars to be shipped to cold districts.

Thus, in the cold districts, it is common practice to apply to the road surface an antifreezing agent such as rock salt, calcium chloride, etc. for the prevention of freezing of the road surface by such an agent dramatically accelerates the corrosion of the car body steel sheets, thereby detracting from the appearance and durability of the cars. To cope with this problem, a rust-inhibiting pigment such as red lead and zinc chromate is usually incorporated in the structural adhesive. However, such pigments contain heavy metals (lead, chromium, etc.) and as such presents safety risks for man and domestic animals because of the toxicity of the metals. In order to overcome the problem, we conducted an intensive research and found that the incorporation of a special aluminum orthophosphate rust inhibiting pigment in an epoxy resin adhesive gives an adhesive composition having an excellent rust preventing effect without interfering with the adhesive function of the epoxy adhesive. The finding was followed by further engineering studies, which have resulted in the present invention. In the assembling of automotive body components, the usual practice comprises hemming the periphery of an outer panel inwardly with respect to the periphery of an inner panel and a water-tight seal is formed using an adhesive. In this procedure, the adhesive is applied in a linear pattern to the periphery of the inner panel and the two peripheries are welded together, for example by spot welding.

The structural adhesive heretofore used for this purpose is a one-component type thermo-setting epoxy resin composition containing a rust inhibiting pigment and a metal powder, e.g. aluminum powder, which is designed to impart a certain degree of electrical conductivity to the adhesive so as to permit spot welding and electrodeposition. However, with such an adhesive composition, the deposition of the coating in and around the adhesive-carrying area is poor and, moreover, the electrode reaction of aluminum or other metal powder results in the evolution of hydrogen gas which causes a multiplicity of pinholes in the adhesive layer. As a result, rust develops from the periphery of the adhesive-carrying area within 24 hours when tested by the salt spray method. This problem is serious as thinner sheet steel is specified for reducing the weight of cars. Therefore, there has been a keen demand for the development of a structural adhesive which is conducive to electrodeposition coating and possessed improved rust inhibiting quality. From this point of view, much research has been undertaken to provide a structural adhesive with anticorrosive property and an adequate degree of electrical conductivity necessary for electrodeposition but there has not been available a structural metal-to-metal adhesive satisfying the above-mentioned requirements. We discovered, under the circumstances, that an adhesive composition with remarkably improved rust inhibitory activity can be obtained by incorporating a rust inhibiting pigment comprising an aluminum orthophosphate and a zinc compound in a thermo-setting epoxy resin adhesive.

The present invention is, therefore, directed to a structural adhesive comprising an epoxy resin, a curing agent therefor, and a rust inhibiting pigment comprising an aluminum orthophosphate and a zinc compound.

DETAILED DESCRIPTION OF THE INVENTION

The epoxy resin as used in accordance with the invention is an epoxy resin selected from the group consisting of the ordinary glycidyl ether, glycidyl ester, glycidyl amine, linear aliphatic epoxide, alicyclic epoxide and other types of epoxy resins. Particularly preferred is a glycidyl ether type epoxy resin with an epoxide equivalent in the range of 150 to 300.

These epoxy resins are used singly or in combination according to the desired physical properties. The use of such an epoxy resin in combination with an urethane-modified epoxy resin is particularly desirable. For the purpose of imparting toughness to the cured adhesive, the ratio of the ordinary epoxy resin to the urethane-modified epoxy resin is in the range of 0.2:0.8 to 0.7:0.3. As examples of the curing agent for such epoxy resins, there may be mentioned dicyanodiamide, 4,4'-diaminodiphenylsulfone, 2-n-heptadecylimidazole and other imidazole derivatives, isophthalic acid dihydrazide, N,N'-dialkylurea derivatives, N,N'-dialkylthiourea derivatives and so on.

The curing agent is incorporated in an amount suitable to the desired cured properties and is preferably used in the range of 1 to 15 parts relative to 100 parts (by weight; the same applies hereinafter) of the epoxy resin.

Referring to the rust inhibiting pigment as used in accordance with the invention, the aluminum orthophosphate is any material containing at least 50 percent of aluminum orthophosphate. As crystal forms of aluminum orthophosphate, such types as berlinite, tridymite and cristobalite types are known.

The aluminum orthophosphate can be obtained by baking a mixture of phosphoric acid and aluminum compound ($P_2O_5/Al_2O_3$=about 0.5 to 2) at a temperature of about 300° to 1,200° C.

The zinc compound can be a sparingly-soluble or insoluble compound which is free of water of crystallization which will be liberated at low temperature but is preferably zinc oxide. The zinc compound which will liberate its water of crystallization at a low temperature less than 150° C. is undesirable in that it will liberate the water of crystallization at baking to produce blisters.

Moreover, such a water-releasing compound cannot be incorporated into water-labile resins. However, even such a compound which is liable to liberate the water of crystallization at a low temperature can be used if it gives a stable compound upon heating to remove the water of crystallization. Therefore, the pigment should exhibit a weight loss of not more than 0.5 percent upon heating at 200° C. for 2 hours.

The manufacture of a rust inhibiting pigment comprising said aluminum orthophosphate and zinc compound can be carried out by the mere dry mixing method or, if required, by wet mixing in water and subsequent dehydration. These components may also be added independently to the resin.

The ratio of said aluminum orthophosphate to said zinc compound in the pigment is virtually optional if it is in the range of 10/1 to 10/10, i.e., if the aluminum orthophosphate content is not less than 50%, and the pH is within the range of 4 to 10.

Particularly a mixture of aluminum phosphate and zinc compound in a ratio of 10/2 to 4 has a pH value of about 6, shows excellent rust inhibiting activity, and is least selective in regard to compatible adhesive resin (binder).

Since the rust inhibiting pigment of this invention contains water of crystallization that will be liberated at low temperature only in a proportion not over 0.5%, it does not cause blisters in the adhesive layer.

The proportion of the rust inhibiting pigment in the epoxy resin composition is preferably in the range of 5 to 50 parts based on 100 parts of epoxy resin.

If the proportion is less than 5 parts, the desired rust inhibition cannot be obtained. If the proportion is over 50 parts, the cured properties of the adhesive composition are adversely affected to yield a brittle adhesive layer.

In order that the cured adhesive composition may accept the electrodeposition coating, it is desirable to incorporate a conductive substance such as carbon black, metal powder (silver, copper, nickel, etc.), ferrite and the like. The proportion of such conductive substance can be selected from within the range of 1 to 30 parts relative to 100 parts of epoxy resin.

The following production and working examples are further illustrative of the invention.

I PRODUCTION EXAMPLE

Aluminum orthophosphate (1) A paste ($P_2O_5/Al_2O_3 = 1/1$) was prepared by heating and mixing one mole of phosphoric acid (commercial product : reagent grade) and 1 mole of aluminum hydroxide (Sumitomo Aluminum Refining Corp.; C-12) and put in a ceramic crucible. The crucible was set in an electric oven and heated at 300° C. for 6 hours and baked at 800° C. for 1 hour. The resulting mass was crushed to give a sample (a).

The above aluminum orthophosphate was predominantly composed of berlinite type and its loss of weight on 2-hour heating at 200° C was 0.11%.

(2) A mixture of one mole of phosphoric acid (same as above) and one mole of aluminum hydroxide (Sumitomo Aluminum Refining Corp.; C-315) was baked at 1,100° C. for 2 hours and crushed to give a sample (b). This aluminum orthophosphate was of cristobalite type and its weight loss on 2-hour heating at 200° C. was 0.05%.

II PRODUCTION OF RUST INHIBITING PIGMENT

Samples (a) and (b) were each mixed with zinc oxide in a ratio of 10:4 to give rust inhibiting pigments A and B, respectively. The pH of each pigment was 6.5 for A and 6.2 for B.

III EXAMPLES 1-5 AND COMPARATIVE EXAMPLES 1 AND 2

Using a kneader, various components were mixed in the proportions indicated in Table 1. The mixture was passed twice over three roller mill and then stirred again under vacuum using the kneader to give a resin composition. Compositions of comparative examples were also prepared in the same manner.

TABLE 1

| | Examples | | | | | Comparative examples | |
|---|---|---|---|---|---|---|---|
| | 1 | 2 | 3 | 4 | 5 | 1 | 2 |
| Epoxy resin (1) | 40 | 40 | 40 | 40 | 40 | 40 | 40 |
| Epoxy resin (2) | 60 | 60 | 60 | 60 | 60 | 60 | 60 |
| Dicyanodiamide | 5 | 5 | 5 | 5 | 5 | 5 | 5 |
| Imidazole (3) | 10 | 10 | 10 | 10 | 10 | 10 | 10 |
| Calcium carbonate | 70 | 50 | 30 | 50 | 50 | 80 | 50 |
| Carbon black (4) | 5 | 5 | 5 | 5 | — | 5 | 5 |
| Aluminum orthophosphate pigment (A) | 10 | 30 | 50 | — | 30 | — | — |
| Aluminum orthophosphate pigment (B) | — | — | — | 30 | — | — | — |
| Conventional rust inhibiting pigment | — | — | — | — | — | — | 30 |
| Total | 200 | 200 | 200 | 200 | 200 | 200 | 200 |

Epoxy resin (1): Yuka Shell Epoxy k.k., Epikote ® 807
Epoxy resin (2): 100 parts of polytetramethylene Ether glycol (mol. wt. 1,000) and 35 parts of tolylene diisocyanate were mixed in a nitrogen-purged and heated to 80° C., at which temperature the mixture was stirred for 3 hours to give an NCO-terminated urethane polymer. To 45 parts of this urethane polymer was added 250 parts of bisphenol A diglycidyl ether (epoxide equivalent: 215, hydroxyl equivalent 900) and the mixture was reacted at 95° C. for 7 hours to give an epoxy resin with an epoxide equivalent of 200.

Imidazole (3): Shikoku Chemical Corp.; 2MZ-AZINE.

Carbon black (4): Akzo Chemi, Ketzen black EC.

METHOD AND RESULTS OF EVALUATION (Evaluation of rust development)

Toluene-degreased steel sheets (70×100×0.8 mm) were coated with the resin compositions of Examples 1 to 5 and Comparative examples 1 and 2, respectively, in a width of 30 mm and a progressively diminishing thickness of 5 mm to 0.5 mm. Then, electrodeposition was carried out at a voltage of 200 V and a current of 0.5 A. As the electrodeposition coating, a cation electrodeposition coating composition of Kansai Paint Co., Ltd. was used. The coated steel sheets were washed with water and subjected to thermal curing at 170° C. for 30 minutes. Using the resulting testpieces, the evaluation of rust development was carried out under the following conditions.

Test (1) : 5% Salt spray test, 35° C., 1,000 hours

Test (2) : Wet (50° C., 95% R.H.), 16 hours; Dry (70° C.), 4 hours; Salt spray (35° C., 5% in water), 4 hours.

Sixty cycles of the above 3 conditions

Test (3) : Wet (as above), 6 hours; Dry (60° C.), 2 hours; Cold (−40° C.), 2 hours; Dry (20° C.), 2 hours.

One-hundred cycles of the above conditions (Evaluation of adhesive strength)

Toluene-degreased steel sheets (100×25×1.6 mm) were coated with the test resin compositions with a lap of 12.5 mm to give shear testpieces. The testpieces were cured at 170° C. for 30 minutes and allowed to stand at room temperature for 24 hours. Then, the shear bond strength was measured.

(Results of evaluation)

The results of evaluation of rust development and bond strength are shown in Table 2.

TABLE 2

|  | Examples | | | | | Comparative examples | |
|---|---|---|---|---|---|---|---|
|  | 1 | 2 | 3 | 4 | 5 | 1 | 2 |
| Test (1) (1,000 hours) | o | o | o | o | o | x | Δ |
| Test (2) (60 cycles) | o | o | o | o | o | x | x |
| Test (3) (100 cycles) | o | o | o | o | o | x | x |
| Bond strength (kg/cm²) | 300 | 300 | 300 | 300 | 300 | 300 | 250 (blister) | o: No rusting of interface and substrate metal
Δ: Rusting of interface
x: Rusting of interface and substrate metal Thus, the present invention overcomes the problems of the prior art rust inhibiting adhesives and provides an excellent bonding performance.

By the synergism between the epoxy resin binder and the rust inhibiting pigment of aluminum orthophosphate-zinc oxide type, the resin composition of the invention assures exceedingly high bonding strength and rust inhibitory effect.

What is claimed is:

1. An adhesive resin composition comprising (a) an epoxy resin, (b) a curing agent therefor, and (c) an aluminum orthophosphate-zinc compound rust inhibiting pigment.

2. The adhesive resin composition of claim 1 wherein zinc compound is zinc oxide.

3. The adhesive resin composition of claim 1 wherein the aluminum orthophosphate content of said rust inhibiting pigment is not less than 50 percent and the weight loss on heating at 200° C. for 2 hours is not more than 0.5 percent.

4. In a structural adhesive adapted for metal-to-metal bonding, which comprises a rust-inhibiting pigment, the improvement wherein the adhesive is a curable epoxy resin containing a curing agent therefor, the rust-inhibiting pigment has a pH of from 4 to 10 and which exhibits a weight loss of not more than 0.5 percent upon heating at 200° C. for 2 hours and is a mixture of aluminum orthophosphate and a zinc compound in a ratio of from 10:1 to 1:1, and the amount of pigment in the adhesive is 5 to 50 parts per 100 parts of epoxy resin.

5. The structural adhesive according to claim 4 wherein said zinc compound is zinc oxide.

6. The structural adhesive according to claim 4 wherein said epoxy resin is a glycidyl ether-type epoxy resin with an epoxy equivalent of 150 to 300.

7. The structural adhesive according to claim 4 wherein said epoxy resin is a mixture of (a) an epoxy resin selected from the group consisting of a glycidyl ether, a glycidyl ester, a glycidyl amine, a linear aliphatic epoxide and an alicyclic epoxide resin and (b) a urethane-modified epoxy resin, in a ratio of 1:4 and 7:3.

8. The structural adhesive according to claim 4 wherein said adhesive contains 1 to 30 parts of a conductive substance per 100 parts of said epoxy resin.

9. The structural adhesive according to claim 8 wherein said conductive substance is carbon black or a metal powder.

10. The structural adhesive according to claim 7 wherein said zinc compound is zinc oxide and wherein said adhesive contains 1 to 30 parts of conductive substance per 100 parts of said epoxy resin.

11. The structural adhesive according to claim 10 wherein said conductive substance is carbon black or a metal powder.

* * * * *